United States Patent [19]

Bauer

[11] Patent Number: 5,427,758
[45] Date of Patent: Jun. 27, 1995

[54] PROCESS FOR THE PREPARATION OF MIXTURES OF SYNTHETIC, CRYSTALLINE MAGADIITE AND SALTS WHICH SPLIT OFF OXYGEN

[75] Inventor: Harald Bauer, Flörsheim, Germany

[73] Assignee: Hoechst Aktiengesellschaft, Frankfurt am Main, Germany

[21] Appl. No.: 202,787

[22] Filed: Feb. 28, 1994

[30] Foreign Application Priority Data

Mar. 13, 1993 [DE] Germany .................. 43 08 063.4

[51] Int. Cl.⁶ ............................. C01B 33/38
[52] U.S. Cl. ............................. 423/332; 423/333
[58] Field of Search .......... 423/332, 333; 502/80, 502/84

[56] References Cited

U.S. PATENT DOCUMENTS

| | | | |
|---|---|---|---|
| 3,959,445 | 5/1976 | Jayawant et al. | 423/332 |
| 4,581,213 | 4/1986 | Rieck | 423/325 |
| 4,626,421 | 12/1986 | Zones | 423/326 |
| 4,728,443 | 3/1988 | Rieck et al. | 252/8.6 |
| 4,806,327 | 2/1989 | Rieck et al. | 423/332 |
| 4,812,222 | 3/1989 | Kirker et al. | 208/89 |
| 5,037,530 | 8/1991 | Kirker et al. | 208/118 |
| 5,068,216 | 11/1991 | Johnson et al. | 502/241 |
| 5,160,718 | 11/1992 | Kosuge et al. | 423/332 |
| 5,183,559 | 2/1993 | Kirker et al. | 208/119 |
| 5,236,681 | 8/1993 | Chu et al. | 423/333 |

FOREIGN PATENT DOCUMENTS

| | | | |
|---|---|---|---|
| 0220586 | 4/1985 | Germany | 423/332 |
| 0221722 | 5/1985 | Germany | 423/332 |

OTHER PUBLICATIONS

*Ullmanns Enzyklopadie der technischen Chemie*, 4th Ed., vol. 17, pp. 724–725. (No Date Available).
Lagaly, G., et al, *American Mineralogist* 60:642–649 (1975). (No Month).

*Primary Examiner*—Mark L. Bell
*Assistant Examiner*—David Sample
*Attorney, Agent, or Firm*—Connolly and Hutz

[57] ABSTRACT

The invention relates to a process for the preparation of mixtures of synthetic, crystalline magadiite and salts which split off oxygen. For this purpose, 1 mol of sodawater glass which has a molar ratio of $SiO_2:Na_2O = 1:(0.25 \text{ to } 0.5)$ is mixed with 0.1 to 0.9 mol of a compound which has a pH of less than 10.5 in molar aqueous concentration, as a neutralizing agent. In the presence of magadiite seed crystals, the reaction mixture is heated at temperatures from 373 to 523 K. in an autoclave for 1 to 15 hours and, after cooling, 0.15 to 1.5 mol of hydrogen peroxide are added per mol of sodawater glass employed. The solid and the dissolved substances are isolated from the reaction suspension as dry substance.

16 Claims, No Drawings

PROCESS FOR THE PREPARATION OF MIXTURES OF SYNTHETIC, CRYSTALLINE MAGADIITE AND SALTS WHICH SPLIT OFF OXYGEN

The invention relates to process for the preparation of mixtures of synthetic, crystalline magadiite and salts which split off oxygen.

Magadiite occurs as a mineral. EUGSTER discovered it for the first time in the bed of Lake Magadi in Kenya (Science 157 (1967) 1177–1180). He identified it as an aluminum-free sodium silicate hydrate with a laminar structure and the composition $Na_2O.14\ SiO_2.9\ H_2O$.

LAGALY synthesized magadiite by a process described in Am. Mineral. 60, 642–649 (1975). In this process, magadiite was obtained from reaction mixtures having a molar composition of $1\ Na_2O:9\ SiO_2:75\ H_2O$ after a crystallization time of 28 days. To prepare the reaction mixture, sodium hydroxide solution is added to an 80% by weight silicic acid until the desired composition is reached.

A disadvantage of this preparation process is the low space/time yield which results, in particular, from the long crystallization time.

Another disadvantage is that of establishing a molar ratio of $SiO_2:Na_2O$ in the reaction mixture by mixing alkali metal hydroxide solution, alkali metal carbonate or alkali metal-water glass with precipitated silicic acid, because this is prepared from alkali metal-water glass. Mineral acid salts which cannot be utilized further and pollute the wastewater are obtained during the preparation from alkali metal-water glass with mineral acid which is customary for this purpose.

Crystalline laminar silicates, which include magadiite, act as ion exchangers and are added to detergents as softeners. Detergents often contain peroxides as bleaching agents, oxidizing agents and disinfectants. Undesirable degradation of the peroxide occurs during storage of the detergent.

There was therefore the object of discovering a process for the preparation of mixtures of synthetic, crystalline magadiite and salts which split off oxygen in which no salt formation leads to an undesirable pollution of the wastewater, which is based on inexpensive starting substances, which operates with good space/time yields and with which only slight decomposition of the peroxide occurs.

This is achieved according to the invention by a procedure which comprises, during preparation of a mixture of magadiite and salts which split off oxygen, mixing 1 mol of soda-water glass which has a molar ratio of $SiO_2:Na_2O=1:(0.25\ to\ 0.5)$ with 0.1 to 0.9 mol of a compound which has a pH of less than 10.5 in molar aqueous concentration, as a neutralizing agent, heating the mixture at temperatures of 373 to 523 K., in particular 423 to 463 K., in an autoclave for 1 to 15 hours in the presence of magadiite seed crystals and, after cooling, adding 0.15 to 1.5 mol of hydrogen peroxide per mol of soda-water glass employed and isolating the solid and the dissolved substances from the reaction suspension as dry substance.

The process according to the invention can furthermore optionally also comprise a procedure in which a) peroxide salt-forming compounds, such as phosphoric acid, boric acid, silicic acid, carbon dioxide, alkali metal hydrogencarbonate, alkali metal hydrogen phosphate or sodium tetraborate, are used in particular as the neutralizing agent;

b) the amount of neutralizing agent is metered in such that a ratio of $SiO_2:Na_2O=(4\ to\ 15):1$ is present in the reaction solution;

c) the hydrogen peroxide is added in the form of a 5 to 75% by weight aqueous solution;

d) 0.5 to 10% by weight of seed crystals, based on the $SiO_2$ weight content in the soda-water glass, is added;

e) the reaction is carried out in an autoclave at a molar ratio of $SiO_2:H_2O=1:(5\ to\ 100)$;

f) the reaction is carried out in an autoclave in the presence of compounds from the group comprising aluminum, phosphorus, boron and heavy metals, such as, for example, iron;

g) the reaction mixture in the autoclave is adjusted to a pH of 9 to 12 before heating;

h) the process is carried out continuously;

i) in the continuous process, 5 to 30% by weight of seed crystals, based on the $SiO_2$ weight content in the soda-water glass, are added;

j) peroxide-stabilizing compounds from the group comprising magnesium silicate, ethylenediaminetetraacetic acid and tripolyphosphoric, pyrophosphoric and orthophosphoric acid, in each case in the form of their sodium salts, are added to the reaction mixture in the autoclave;

k) the solid and the substances dissolved in the reaction suspension are isolated as dry substance by vacuum evaporation;

l) the dry substance is isolated from the reaction suspension with a heated stream of gas at a solids temperature of between 303 and 363 K. in a fluidized bed drier, drum drier, spray drier or granulator;

m) the reaction suspension is separated into a filtercake and filtrate, which are dried separately, and the resulting dry substances are mixed with one another;

n) some of the hydrogen peroxide is added to the filtrate, the filtrate is evaporated to dryness and the residue is combined in comminuted form with the dry filtercake;

o) 1 mol of soda-water glass which has a molar ratio of $SiO_2:Na_2O=1:(0.25\ to\ 0.5)$ is mixed with 0.1 to 0.9 mol of a compound which has a pH of less than 10.5 in molar aqueous concentration, as the neutralizing agent, and the mixture is heated at temperatures of 373 to 523 K., in particular 423 to 463 K., in an autoclave for 1 to 15 hours in the presence of magadiite seed crystals, the dry substance is isolated and 0.15 to 1.5 mol of hydrogen peroxide per mol of soda-water glass employed are added to this dry substance.

The mixture prepared by the process according to the invention can be employed for washing, cleaning, bleaching or rinsing textiles or utensils by itself or together with customary auxiliaries, such as, for example, surfactants, zeolites, tripolyphosphates, builders or oxycarboxylates.

Reaction times of not more than 15 hours at reaction temperatures of 433 to 463 K. are required for the synthesis of magadiite.

The addition of seed crystals has an essential influence on the nature of the laminar silicates which crystallize out and the reaction times. However, magadiite is also formed, in a reduced purity, over longer reaction times without the addition of seed crystals. It goes without saying that the finished salt mixture or the suspension can also be added as the seed crystal.

It is advantageous for a continuous reaction procedure not to empty the autoclave completely but always to keep it filled at least in part with product mixture formed from the silicate which has crystallized out, the mother liquor and unreacted starting substances. A high content of silicate crystals thus remains in the autoclave, promoting further formation of crystalline silicate.

The reaction of the alkali metal salts with hydrogen peroxide can be carried out in the same container as the laminar silicate synthesis. It is then advantageous to evaporate the entire reaction solution.

Mixtures which comprise up to 19.6, preferably up to 13.9% by weight of peroxide can be obtained according to the invention.

The salt load of the wastewater which results from the sodium carbonate peroxohydrate preparation and is caused by the preparation is also eliminated by the process according to the invention.

Sodium carbonate peroxohydrate, which is used as a bleaching agent, oxidizing agent and disinfectant, is obtained from aqueous solutions of sodium carbonate and hydrogen peroxide, sodium chloride, sodium polyphosphates or polyacrylates being used as salting out and crystallization auxiliaries (cf. "Ullmanns Encyklopä die der technischen Chemie (Ullmann's Encyclopedia of Industrial Chemistry)", 4th Edition, Volume 17, pages 724/725).

The good properties of the mixture according to the invention are based on the one hand on the ion exchange capacity of the magadiite, which means that the hardness-forming agents of the washwater do not precipitate out, and on the other hand, because of the significantly lower alkalinity, on a distinct stabilization of the peroxide content during storage.

Products which are prepared according to optional embodiment o) have a lower storage stability of the peroxide.

The invention is illustrated in more detail with the aid of the examples.

EXAMPLE 1

966 g of reaction mixture having the molar composition of 0.311 $Na_2O$: 0.0054 $Al_2O_3$:1 $SiO_2$:32.6 $H_2O$ are prepared from 331 parts by weight of soda-water glass (26.3% of $SiO_2$, 8.43% of $Na_2O$ and 0.24% of $Al_2O_3$) and 635 parts by weight of water. 2 g of crystalline magadiite from a previous experiment are added and $CO_2$ is passed in at 347 K., while stirring, up to a pH of 10.1. The reaction mixture is heated to 438 K. in a stainless steel autoclave, while stirring, and is kept under these conditions under a pressure of 7 bar for 8 hours. After cooling, 30 g of $H_2O_2$ (70% by weight) are added to the suspension and the mixture is evaporated to dryness in vacuo at 0.5 to 0.1 bar. 154.3 g of a mixture of magadiite and sodium percarbonate with a peroxide content of 10.29% by weight (as $H_2O_2$) are obtained.

EXAMPLE 2

An aqueous suspension of magadiite and sodium carbonate is prepared from soda-water glass in accordance with Example 1. The solid is filtered off and dried separately at 383 K. 30 g of $H_2O_2$ (70% by weight) are added to the filtrate, the mixture is evaporated to dryness in vacuo at 0.5 to 0.1 bar and the residue is comminuted. After the two dry substances have been mixed, 185.3 g of a mixture of magadiite and sodium percarbonate having a peroxide content of 11.3% by weight (as $H_2O_2$) are obtained.

EXAMPLE 3

The water-glass solution is prepared with magadiite seed crystals and 30.5 g of $H_3BO_3$ in accordance with Example 1. The reaction mixture is further treated as in Example 1. After cooling, 38.1 g of $H_2O_2$ (70% by weight) are added to the solution and the mixture is evaporated to dryness. 180.85 g of a mixture of magadiite and sodium perborate having a peroxide content of 14.2% by weight (as $H_2O_2$) are obtained.

EXAMPLE 4

The water-glass solution is prepared with magadiite seed crystals and 41.3 g of $NaHCO_3$, while stirring, in accordance with Example 1. The reaction mixture is further treated as in Example 1. After cooling, 58.8 g of $H_2O_2$ (70% by weight) are added to the solution and the mixture is evaporated to dryness. 167.2 g of a mixture of magadiite and sodium percarbonate having a peroxide content of 7.81% by weight (as $H_2O_2$) are obtained.

We claim:

1. A process for the preparation of a mixture of synthetic, crystalline magadiite and salts which split off oxygen, which comprises mixing 1 mol of soda-water glass which has a molar ratio of $SiO_2$:$Na_2O$=1:(0.25 to 0.5) with 0.1 to 0.9 mol of a compound which has a pH of less than 10.5 in molar aqueous concentration, as a neutralizing agent, heating the mixture at temperatures of 373 to 523 K, in an autoclave for 1 to 15 hours in the presence of magadiite seed crystals and, after cooling, adding 0.15 to 1.5 mol of hydrogen peroxide per mol of soda-water glass employed and isolating the solid and the dissolved substances from the reaction suspension as dry substance.

2. The process as claimed in claim 1, wherein peroxide salt-forming compounds selected from the group consisting of phosphoric acid, boric acid, silicic acid, carbon dioxide, alkali metal hydrogencarbonate, alkali metal hydrogen phosphate and sodium tetraborate are used as the neutralizing agent.

3. The process as claimed in claim 1, wherein the amount of neutralizing agent is adjusted in such that a ratio of $SiO_2$:$Na_2O$=(4 to 15):1 is present in the reaction solution.

4. The process as claimed in claim 1, wherein the hydrogen peroxide is added in the form of a 5 to 75% by weight aqueous solution.

5. The process as claimed in claim 1, wherein 0.5 to 10% by weight of seed crystals, based on the $SiO_2$ weight content in the soda-water glass, is added.

6. The process as claimed in claim 1, wherein the reaction is carried out in an autoclave at a molar ratio of $SiO_2$:$H_2O$=1:(5 to 100).

7. The process as claimed in claim 1, wherein the reaction is carried out in an autoclave in the presence of compounds selected from the group consisting of aluminum, phosphorus, boron and heavy metals.

8. The process as claimed in claim 1, wherein the reaction mixture in the autoclave is brought to a pH of 9 to 12 before heating.

9. The process as claimed in claim 1, wherein the process is carried out continuously.

10. The process as claimed in claim 9, wherein, in the continuous process, 5 to 30% by weight of seed crystals, based on the SiO$_2$ weight content in the soda-water glass, are added.

11. The process as claimed in claim 1, wherein peroxide-stabilizing compounds selected from the group consisting of magnesium silicate, ethylenediaminetetraacetic acid and tripolyphosphoric, pyrophosphoric and orthophosphoric acid, in each case in the form of their sodium salts, are added to the reaction mixture in the autoclave.

12. The process as claimed in claim 1, wherein the solid and the substances dissolved in the reaction suspension are isolated as the dry substance by vacuum evaporation.

13. The process as claimed in claim 1, wherein the dry substance is isolated from the reaction suspension with a heated stream of gas at a solids temperature of between 303 and 363 K. in a fluidized bed drier, drum drier, spray drier or granulator.

14. The process as claimed in claim 1, wherein the reaction suspension is separated into a filtercake and filtrate, which are dried separately, and the resulting dry substances are mixed with one another.

15. The process as claimed in claim 1, wherein the reaction suspension is separated into a filtercake and a filtrate, the filtercake is dried, some of the hydrogen peroxide is added to the filtrate, the mixture is evaporated to dryness and the residue is combined in comminuted form with the dried filtercake.

16. The process as claimed in claim 1, additionally comprising isolating the dry substance and adding to the dry substance 0.15 to 1.5 mol of hydrogen peroxide per mole of soda-water glass employed.

* * * * *